United States Patent
Ikeda (10) Patent No.: US 11,381,746 B2
(45) Date of Patent: Jul. 5, 2022

(54) APPARATUS AND METHOD FOR SETTING A CORRECTION AXIS FOR IMAGE STABILIZATION

(71) Applicant: CANON KABUSHIKI KAISHA, Tokyo (JP)

(72) Inventor: Shunichiro Ikeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/083,019

(22) Filed: Oct. 28, 2020

(65) Prior Publication Data

US 2021/0136290 A1 May 6, 2021

(30) Foreign Application Priority Data

Oct. 30, 2019 (JP) .............................. JP2019-197651

(51) Int. Cl.
*H04N 5/232* (2006.01)

(52) U.S. Cl.
CPC ..... *H04N 5/23287* (2013.01); *H04N 5/23245* (2013.01); *H04N 5/23251* (2013.01)

(58) Field of Classification Search
CPC ........... H04N 5/23287; H04N 5/23245; H04N 5/23251; H04N 5/23296
See application file for complete search history.

(56) References Cited

U.S. PATENT DOCUMENTS

| | | | | |
|---|---|---|---|---|
| 9,606,371 | B2* | 3/2017 | Takeuchi | G02B 27/646 |
| 2013/0271644 | A1* | 10/2013 | Ueda | G03B 17/14 |
| | | | | 348/345 |
| 2015/0264266 | A1* | 9/2015 | Katsuyama | H04N 5/23209 |
| | | | | 348/208.2 |
| 2016/0054642 | A1* | 2/2016 | Takeuchi | G03B 5/02 |
| | | | | 396/55 |
| 2016/0127649 | A1* | 5/2016 | Tsuchiya | H04N 5/23287 |
| | | | | 348/208.11 |
| 2017/0019600 | A1* | 1/2017 | Koyano | G03B 17/14 |

FOREIGN PATENT DOCUMENTS

| | | |
|---|---|---|
| JP | 2009-267681 A | 11/2009 |
| JP | 2010-054986 A | 3/2010 |
| JP | 2010-091792 A | 4/2010 |
| JP | 2017-021253 A | 1/2017 |
| JP | 2017-126040 A | 7/2017 |

* cited by examiner

*Primary Examiner* — Padma Haliyur
(74) *Attorney, Agent, or Firm* — Cowan, Liebowitz & Latman, P.C.

(57) ABSTRACT

An image stabilization apparatus comprises a setting unit that sets a correction axis to be used in image stabilization among correction axes of a first image stabilization unit based on a shooting state of an image capturing apparatus; and a calculation unit that obtains a driving amount of the first image stabilization unit for correcting a shake with respect to the set correction axis based on an amount of shake of the image capturing apparatus. The setting unit sets the correction axis so that a different correction axis is set in a case where the image capturing apparatus is in a moving image shooting state and in a case where the image capturing apparatus is in a still image shooting state.

19 Claims, 8 Drawing Sheets

STILL IMAGE UNDER EXPOSURE

| LENS TYPE | CAPABILITY OF SIMULTANEOUS CORRECTION | IMAGE STABILIZATION LENS | | | IMAGE SENSOR | | |
|---|---|---|---|---|---|---|---|
| | | ANGULAR SHAKE Pitch/Yaw | SHIFT SHAKE X/Y | ROLL SHAKE Roll | ANGULAR SHAKE Pitch/Yaw | SHIFT SHAKE X/Y | ROLL SHAKE Roll |
| ANGULAR-SHAKE-CORRECTABLE LENS | CAPABLE | ○ | — | — | ○ | ○ | ○ |
| | NOT CAPABLE | ○ | — | — | — | ○ | ○ |
| ANGULAR-AND-SHIFT-SHAKE-CORRECTABLE LENS | CAPABLE | ○ | ○ | — | ○ | — | ○ |
| | NOT CAPABLE | ○ | ○ | — | — | — | ○ |
| LENS WITH NO IMAGE STABILIZATION FUNCTION | — | — | — | — | ○ | ○ | ○ |

F I G. 6B

STILL IMAGE STANDBY STATE

| LENS TYPE | CAPABILITY OF SIMULTANEOUS CORRECTION | IMAGE STABILIZATION LENS | | | IMAGE SENSOR | | |
|---|---|---|---|---|---|---|---|
| | | ANGULAR SHAKE Pitch/Yaw | SHIFT SHAKE X/Y | ROLL SHAKE Roll | ANGULAR SHAKE Pitch/Yaw | SHIFT SHAKE X/Y | ROLL SHAKE Roll |
| ANGULAR-SHAKE-CORRECTABLE LENS | CAPABLE | ○ | — | — | — | — | — |
| | NOT CAPABLE | ○ | — | — | — | — | — |
| ANGULAR-AND-SHIFT-SHAKE-CORRECTABLE LENS | CAPABLE | ○ | — | — | — | — | — |
| | NOT CAPABLE | — | — | — | ○ | — | — |
| LENS WITH NO IMAGE STABILIZATION FUNCTION | — | — | — | — | — | — | — |

FIG. 6C

MOVING IMAGE

| LENS TYPE | CAPABILITY OF SIMULTANEOUS CORRECTION | IMAGE STABILIZATION LENS | | | IMAGE SENSOR | | |
|---|---|---|---|---|---|---|---|
| | | ANGULAR SHAKE Pitch/Yaw | SHIFT SHAKE X/Y | | ANGULAR SHAKE Pitch/Yaw | SHIFT SHAKE X/Y | ROLL SHAKE Roll |
| ANGULAR-SHAKE-CORRECTABLE LENS | CAPABLE | ○ | — | — | ○ | ○ | ○ |
| | NOT CAPABLE | ○ | — | — | — | ○ | ○ |
| ANGULAR-AND-SHIFT-SHAKE-CORRECTABLE LENS | CAPABLE | ○ | — | — | ○ | ○ | ○ |
| | NOT CAPABLE | — | — | — | — | ○ | ○ |
| LENS WITH NO IMAGE STABILIZATION FUNCTION | — | | | | ○ | ○ | ○ |

FIG. 7

PRIOR ART

APPARATUS AND METHOD FOR SETTING A CORRECTION AXIS FOR IMAGE STABILIZATION

BACKGROUND OF THE INVENTION

Field of the Invention

The present invention relates to an image stabilization apparatus, an image stabilization method, and an image capturing apparatus.

Description of the Related Art

In recent years, many image capturing apparatuses such as still cameras and video cameras have an image stabilization function. In particular, two types of configurations for optically performing image stabilization are known. One is to realize an image stabilization operation mainly by moving a correction lens dedicated to image stabilization (hereinafter, referred to as "image stabilization lens") in a direction orthogonal to the optical axis. The other is to realize an image stabilization operation by moving an image sensor (hereinafter, referred to as "image stabilization sensor") in a direction orthogonal to an optical axis and rotating the image stabilization sensor about the optical axis.

A shake can be decomposed into shakes with respect to five axes which include two types of angular shakes, two types of shift shakes, and one type of roll shake. The angular shakes are a pitch shake in the vertical direction and a yaw shake in the horizontal direction. The shift shakes are translational shakes in the vertical and horizontal directions. The roll shake is a rotational shake about an optical axis. Then, there are correction axes corresponding to these shakes with respect to the five axes, respectively.

An image stabilization effect can be obtained by driving one or by simultaneously driving both of the two image stabilization configurations described above for each axis.

Figure 7:
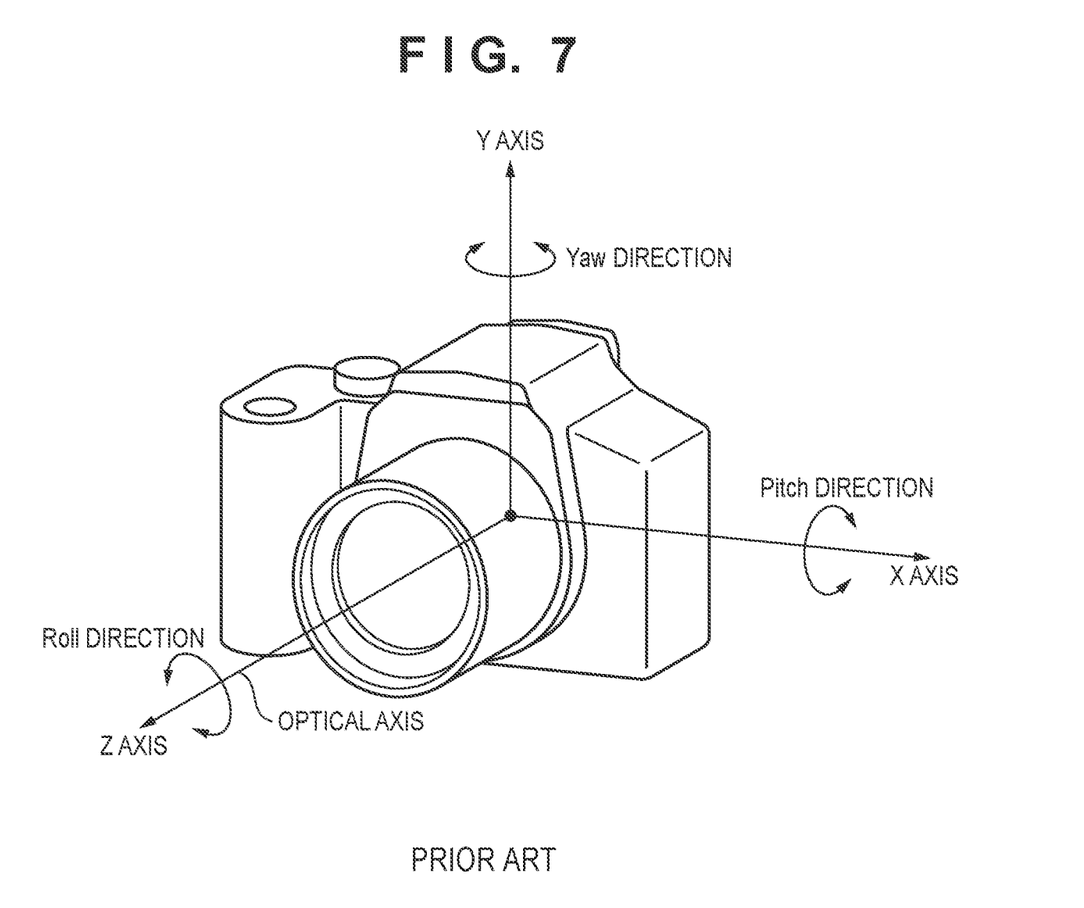
FIG. 7 is a diagram illustrating a pitch direction, a yaw direction, and a roll direction of an image capturing apparatus.

FIG. 7 shows a pitch direction, a yaw direction, and a roll direction in an image capturing apparatus. As shown in FIG. 7, in the image capturing apparatus, the optical axis of an imaging optical system is defined as the Z axis, the vertical direction when the image capturing apparatus is in the upright state is defined as the Y axis, and the direction orthogonal to the Y axis and the Z axis is defined as the X axis. Then, the pitch direction is the rotation direction about the X axis (tilt direction), the yaw direction is the rotation direction about the Y axis (pan direction), and the roll direction is the rotation direction about the Z axis (a direction in which an imaging plane rotates in a plane orthogonal to the optical axis). In other words, the pitch direction is a direction that a horizontal plane tilts in the vertical direction, and the yaw direction is a direction that a vertical plane tilts in the horizontal direction, and the pitch direction and the yaw directions are orthogonal to each other.

Further, the horizontal and vertical directions as indicated by the X axis and the Y axis are the X direction and the Y direction of the shift shakes.

Considering a case of using an image stabilization lens, many of image stabilization lenses mainly correct the angular shakes, namely, the pitch shake and yaw shake, but there are some lenses that can also correct the shift shakes. On the other hand, considering a case of using an image stabilization sensor for correction, the roll shake can be further corrected in addition to the angular shakes and the shift shakes.

Since both the image stabilization lens and the image stabilization sensor can correct the pitch shake and yaw shake, which are the angular shakes, so either of them may be used to correct the shakes, or both of them may be used to simultaneously perform correction of the shakes by using the same correction axes by exchanging correction information between the camera and the lens.

Here, when performing image stabilization using the image stabilization lens and/or the image stabilization sensor, there are mechanical limits (hereinafter, referred to as "correction limits") in a correction amount for the image stabilization. In particular, the image stabilization sensor performs control such that correction amounts for respective shakes do not exceed the correction limits which are set within the ranges determined by a correction ratio between the angular shakes, the shakes in the translational directions such as the shift shakes, and the shake in the rotational direction such as the roll shake. For example, as compared with the correction limits for the translational shakes when the roll shake in the rotation direction is not corrected, the correction limits for the translational shakes when the roll shake in the rotation direction is corrected become smaller depending on the rotation angle.

Japanese Patent Laid-Open No. 2010-091792 discloses a camera body that receives data relating to a lens-side image stabilization mechanism from a lens barrel and operates at least one of a body-side image stabilization mechanism and the lens-side image stabilization mechanism based on the received data.

Further, Japanese Patent Laid-Open No. 2017-021253 discloses a camera system which sets a larger correction range for the roll shake when an interchangeable lens is capable of correcting shakes in the pitch direction and yaw direction than when an interchangeable lens is not capable of correcting shakes in the pitch direction and yaw direction, and performs control according to a shake correction ratio.

A correction axis or axes for driving the image stabilization sensor change depending on whether or not the lens to be mounted includes an image stabilization lens and whether or not the image stabilization lens and the image stabilization sensor can be simultaneously used to correct shakes using the same correction axes.

Further, as described above, the correction amounts of the image stabilization sensor are restricted by the mechanical correction limits, and if an attempt is made to secure the correction amount in the rotation direction, the correction amounts in the translational directions are restricted. Particularly, the larger the correction amount in the rotation direction is, the smaller the correction amounts in the translation directions become.

In Japanese Patent Laid-Open No. 2010-091792, determination to operate at least one of the body-side image stabilization mechanism and the lens-side image stabilization mechanism is made based on whether or not the lens-side image stabilization mechanism exists. However, if the correction axes are fixed based only on the lens type, there arises a problem that the image stabilization sensor cannot be effectively used in various shooting conditions.

Further, in Japanese Patent Laid-Open No. 2017-021253, the correction range in the roll direction is changed depending on whether or not the interchangeable lens is capable of correcting shakes in the pitch direction and yaw direction. However, if the correction amount is fixed based only on the lens type, there arises a problem that the image blur correction sensor cannot be effectively used in various shooting conditions.

SUMMARY OF THE INVENTION

The present invention has been made in consideration of the above situation, and is to effectively utilize a correction range in an image stabilization operation in various shooting conditions.

According to the present invention, provided is an image stabilization apparatus comprising: a setting unit that sets a correction axis to be used in image stabilization among correction axes of a first image stabilization unit based on a shooting state of an image capturing apparatus; and a calculation unit that obtains a driving amount of the first image stabilization unit for correcting a shake with respect to the set correction axis based on an amount of shake of the image capturing apparatus, wherein the setting unit sets the correction axis so that a different correction axis is set in a case where the image capturing apparatus is in a moving image shooting state and in a case where the image capturing apparatus is in a still image shooting state, and wherein each unit is implemented by one or more processors, circuitry or a combination thereof.

Further, according to the present invention, provided is an image capturing apparatus comprising: an image sensor that performs photoelectric conversion on a subject image; and an image stabilization apparatus which comprises: a setting unit that sets a correction axis to be used in image stabilization among correction axes of a first image stabilization unit based on a shooting state of the image capturing apparatus; and a calculation unit that obtains a driving amount of the first image stabilization unit for correcting a shake with respect to the set correction axis based on an amount of shake of the image capturing apparatus, wherein the setting unit sets the correction axis so that a different correction axis is set in a case where the image capturing apparatus is in a moving image shooting state and in a case where the image capturing apparatus is in a still image shooting state, wherein the first image stabilization unit is comprised of the image sensor and a driving unit that drives the image sensor with respect to the correction axes, and wherein each unit is implemented by one or more processors, circuitry or a combination thereof.

Furthermore, according to the present invention, provided is an image capturing apparatus comprising: an image sensor that performs photoelectric conversion on a subject image formed by a lens unit and outputs an image signal; and an image stabilization apparatus which comprises: a setting unit that sets a correction axis to be used in image stabilization among correction axes of a first image stabilization unit based on a shooting state of the image capturing apparatus; and a calculation unit that obtains a driving amount of the first image stabilization unit for correcting a shake with respect to the set correction axis based on an amount of shake of the image capturing apparatus, wherein the setting unit sets the correction axis so that a different correction axis is set in a case where the image capturing apparatus is in a moving image shooting state and in a case where the image capturing apparatus is in a still image shooting state, wherein the first image stabilization unit is comprised of an image stabilization lens included in the lens unit and a driving unit that drives the image stabilization lens with respect to the correction axes, and wherein each unit is implemented by one or more processors, circuitry or a combination thereof.

Further, according to the present invention, provided is an image stabilization method comprising: setting a correction axis to be used in image stabilization among correction axes of a first image stabilization unit based on a shooting state of an image capturing apparatus; and obtaining a driving amount of the first image stabilization unit for correcting a shake with respect to the set correction axis based on an amount of shake of the image capturing apparatus, wherein a different correction axis is set in a case where the image capturing apparatus is in a moving image shooting state and in a case where the image capturing apparatus is in a still image shooting state.

Further, according to the present invention, provided is a non-transitory computer-readable storage medium, the storage medium storing a program that is executable by the computer, wherein the program includes program code for causing the computer to function as an image stabilization apparatus comprising: a setting unit that sets a correction axis to be used in image stabilization among correction axes of a first image stabilization unit based on a shooting state of an image capturing apparatus; and a calculation unit that obtains a driving amount of the first image stabilization unit for correcting a shake with respect to the set correction axis based on an amount of shake of the image capturing apparatus, wherein the setting unit sets the correction axis so that a different correction axis is set in a case where the image capturing apparatus is in a moving image shooting state and in a case where the image capturing apparatus is in a still image shooting state.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
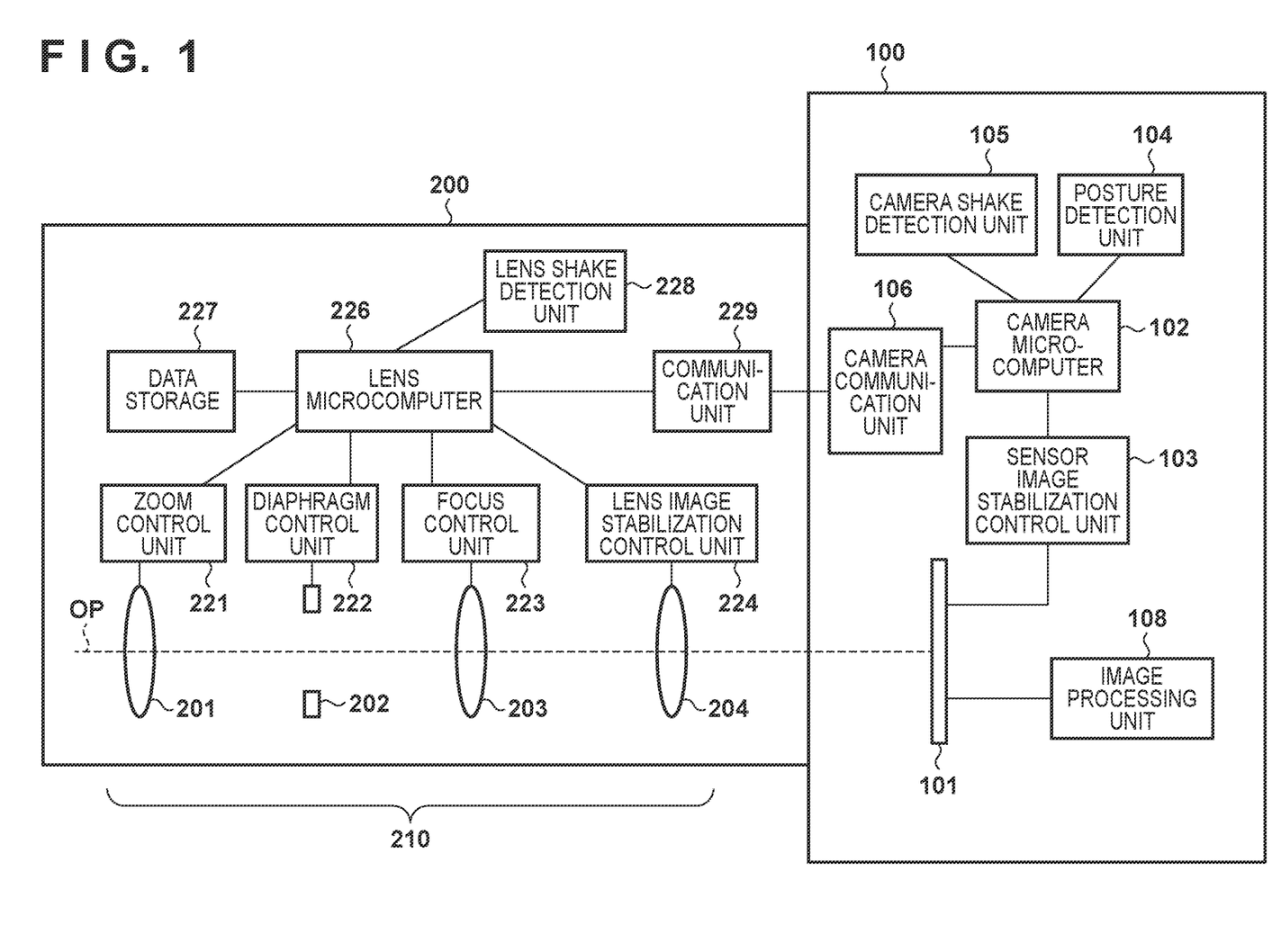
FIG. 1 is a block diagram showing a schematic configuration of an image capturing system according to the present invention.

FIG. 1 is a block diagram showing a schematic configuration of an image capturing system according to the present invention. The image capturing system according to the present invention includes a camera body 100 and an imaging lens device (referred to as "an interchangeable lens", hereinafter) 200 that is attachable to and detachable from the camera body 100. The camera body 100 may be a still camera or a video camera.

In the camera body 100, an image sensor 101 senses (photoelectrically converts) an image of a subject formed by an imaging optical system 210 included in the interchangeable lens 200. An output signal (image signal) from the image sensor 101 is input to an image processing unit 108. The image processing unit 108 performs various kinds of image processing on the image signal to generate image data. The image data is displayed on a monitor (not shown) or recorded on a recording medium (not shown).

The image sensor 101 can be moved in a direction intersecting an optical axis OP of the imaging optical system 210 by a shifting mechanism described later. For example, the image sensor 101 can shift in a plane orthogonal to the optical axis OP or rotate about the optical axis OP in the plane orthogonal to the optical axis OP.

A camera shake detection unit 105 detects a shake of the camera body 100 (hereinafter, referred to as "camera shake") caused by a user's hand shake or the like, and outputs a camera shake detection signal indicating the camera shake to a camera microcomputer 102. The camera microcomputer 102 has a function as a control unit that controls the movement of the image sensor 101. The camera microcomputer 102 calculates a shift amount (driving amount) of the image sensor 101 for reducing (correcting) image shake due to camera shake using the camera shake detection signal, and issues an image stabilization instruction including the shift amount to a sensor image stabilization control unit 103. The sensor image stabilization control unit 103 controls an actuator included in the shifting mechanism in accordance with the image stabilization instruction from the camera microcomputer 102 to shift the image sensor 101 by the shift amount. As a result, sensor image stabilization (image shake correction) is performed.

The camera microcomputer 102 instructs a posture detection unit 104 to detect the posture of the camera body 100 (hereinafter referred to as "camera posture"), and the posture detection unit 104 detects the camera posture and sends a posture detection signal to the camera microcomputer 102. The camera posture includes an upright state, vertical states (grip on the top, and grip on the bottom), and a facing-up state. Further, the camera microcomputer 102 can communicate with a lens microcomputer 226 via a camera communication unit 106 and a lens communication unit 229 in the interchangeable lens 200.

In the interchangeable lens 200, the imaging optical system 210 has a zoom lens 201, a diaphragm 202, a focus lens 203, and an image stabilization lens (optical element) 204. A zoom control unit 221 can detect the position of the zoom lens 201 (referred to as "zoom position", hereinafter), and drives the zoom lens 201 according to a zoom drive command from the camera microcomputer 102 to change the magnification. A focus control unit 223 can detect the position of the focus lens 203 (referred to as "focus position", hereinafter), and performs focus adjustment by driving the focus lens 203 according to a focus drive command from the camera microcomputer 102.

A diaphragm control unit 222 can detect an aperture diameter of the diaphragm 202 (referred to as "aperture position", hereinafter), and drives the diaphragm 202 according to a diaphragm drive command from the camera microcomputer 102 to adjust the light amount. The diaphragm control unit 222 may detect and control the aperture position continuously, or may detect and control the aperture position discontinuously such as the full-open position, positions changed by two stops (medium), and positions changed by one stop (minimum). Further, in detecting the aperture position, the aperture position may be detected using the driving amount of the driving mechanism that drives the diaphragm 202.

Then, the zoom position, the aperture position and the focus position detected by the zoom control unit 221, the diaphragm control unit 222 and the focus control unit 223, respectively, are transmitted to the camera microcomputer 102. The zoom position to be transmitted may be information on the position of the zoom lens 201 or information on the focal length corresponding to the zoom position.

When stabilizing the image, the image stabilization lens 204 can be shifted by a shifting mechanism (not shown) in a direction including a direction component which is orthogonal to the optical axis. That is, the image stabilization lens 204 may shift in a plane orthogonal to the optical axis, or may rotate about a point on the optical axis.

A lens shake detection unit 228 detects the shake of the interchangeable lens 200 (referred to as "lens shake", hereinafter) caused by the user's hand shake and so on, and outputs a lens shake detection signal indicating the lens shake to the lens microcomputer 226.

The lens microcomputer 226 calculates a shift amount (driving amount) of the image stabilization lens 204 for reducing (correcting) the image shake caused by the lens shake by using the lens shake detection signal, and outputs an image stabilization instruction including the shift amount to a lens image stabilization control unit 224. The lens image stabilization control unit 224 controls the movement of the image stabilization lens 204 based on the image stabilization instruction from the lens microcomputer 226. Specifically, lens image stabilization is performed by driving the image stabilization lens 204 by the calculated shift amount by controlling the actuator included in the shifting mechanism according to the image stabilization instruction. The lens microcomputer 226 has a function as a transmission unit that reads information such as image circle information and the like described later stored in a data storage 227 and transmits the image circle information and the like to the camera body 100.

The data storage 227 stores optical information such as a zoom range (changeable range of focal length), a focus range (focusable distance range), a changeable range of an aperture value, and so on of the imaging optical system 210. The data storage 227 also stores information about the image circle of the imaging optical system 210 (referred to as "image circle information", hereinafter). Here, the image circle information includes information indicating the position of the image circle and information indicating the size of the image circle. In this embodiment, image circle center information indicating the center position of the image circle is stored as information indicating the position of the image circle.

Figure 2A:
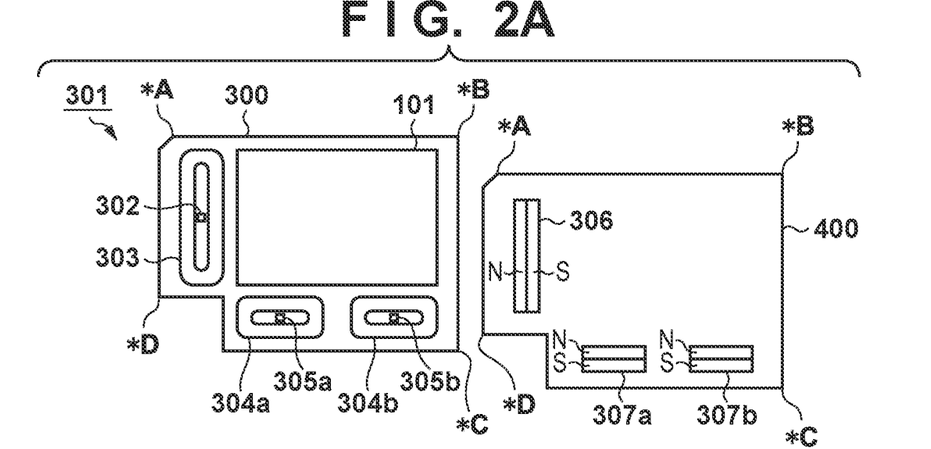
FIGS. 2A to 2D are views showing a schematic configuration of an image stabilization driving unit and states thereof when it is driven.

FIG. 2A is a diagram showing a schematic configuration of an image stabilization driving unit 301 which is a shifting mechanism for shifting the image sensor 101. In FIG. 2A, a member 300 shown on the left side and a member 400 shown on the right side correspond to each other at positions

*A to *D, and the member 300 and the member 400 are superposed so that the member 300 is shiftable with respect to the member 400.

In the member 300 of the image stabilization driving unit 301, an X-axis driving coil 303, a position sensor 302 that detects displacement in the X-axis direction, Y-axis driving coils 304a and 304b, and position sensors 305a and 305b that detect displacement in the Y-axis direction are arranged. Hall elements are usually used for the position sensor 302 and the position sensors 305a and 305b.

In the member 400, an X-axis permanent magnet 306 that forms a pair with the X-axis driving coil 303, and Y-axis permanent magnets 307a and 307b that form pairs with the Y-axis driving coils 304a and 304b, respectively.

Figure 2B:
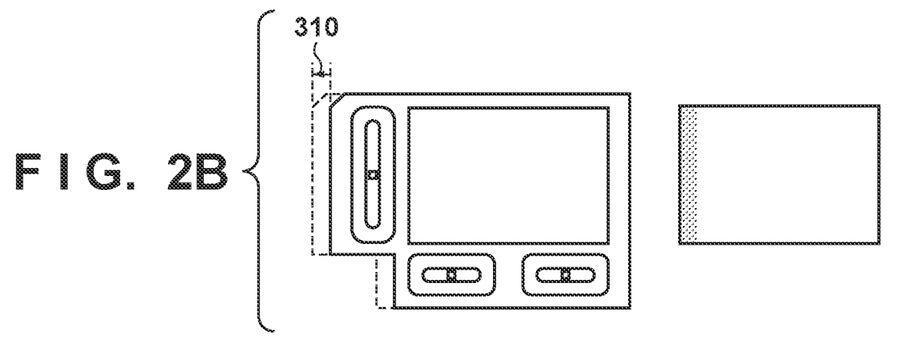

FIG. 2B is a diagram showing a shifted state of the member 300 when the X-axis driving coil 303 is energized. Here, as an example, a case is shown in which the member 300 is shifted by a shift amount 310 in the −X direction (left direction). The magnetic flux generated in the energized X-axis driving coil 303 and the magnetic flux generated by the X-axis permanent magnet 306 magnetically interfere with each other to generate a Lorentz force. The image stabilization driving unit 301 uses this Lorentz force as thrust (driving force) to move the member 300 linearly in the X direction.

At that time, if the member 300 is driven extremely to the plus side (right direction) or to the minus side (left direction) in the X-axis direction, the light passing through the lens will cause uneven exposure on the image sensor 101, so the member 300 is usually not driven to the limit. The diagram on the right side of FIG. 2B shows an example of uneven exposure that may occur in the image sensor 101 when the member 300 is largely driven to the minus side.

Figure 2C:
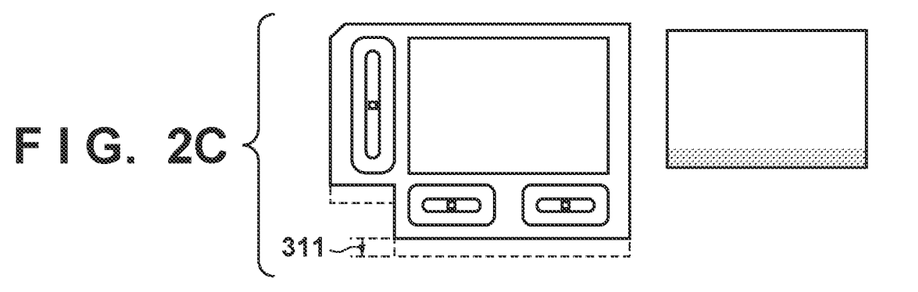

FIG. 2C is a diagram showing a shifted state of the member 300 when the Y-axis driving coils 304a and 304b are energized in the same direction. Here, as an example, a case is shown in which the member 300 is shifted by a shift amount 311 in the −Y direction (downward). By energizing the Y-axis driving coils 304a and 304b in the same direction, the image stabilization driving unit 301 uses the Lorentz force as a thrust (driving force) generated with the same principle as in the X axis, to move the member 300 linearly in the Y direction.

At that time, if the member 300 is driven extremely to the plus side (right direction) or to the minus side (left direction) in the Y-axis direction, the light passing through the lens will cause uneven exposure on the image sensor 101, similarly to a case of driving the member 300 in the X-axis direction, so the member 300 is usually not driven to the limit. The diagram on the right side of FIG. 2C shows an example of uneven exposure that may occur in the image sensor 101 when the member 300 is largely driven to the minus side.

Figure 2D:
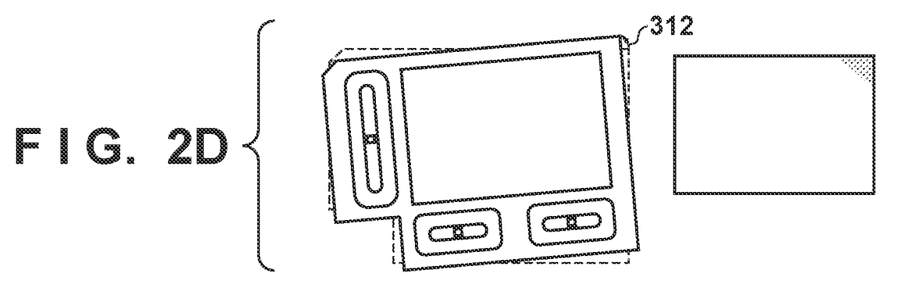

FIG. 2D is a diagram showing a shifted state of the member 300 when the Y-axis driving coils 304a and 304b are energized in the opposite directions. Here, as an example, a case is shown in which the member 300 is rotated by a rotation amount 312 in the counterclockwise direction. By energizing the Y-axis driving coils 304a and 304b in the opposite directions, the image stabilization driving unit 301 uses the Lorentz force as a thrust (driving force) generated with the same principle as in the X axis, to rotate the member 300. The diagram on the right side of FIG. 2D shows an example of uneven exposure that may occur in the image sensor 101 when the member 300 is rotated in the counterclockwise direction while the member 300 is largely driven upward.

Next, the correction range in the roll direction and the correction ranges in the pitch and yaw directions for preventing the uneven exposure as shown in the drawings on the right side of FIGS. 2B to 2D will be described with reference to FIGS. 3A and 3B. Since the correction limit in the roll direction tends to be smaller than the correction limits in the pitch direction and the yaw direction due to the mechanical structure, good correction efficiency is achieved by determining the maximum correction amount in the roll direction first.

At this time, there is a relationship of (total maximum correction amount in the pitch and yaw directions)=(correction limit−maximum correction amount in the roll direction). The details of how to calculate the maximum correction amounts in the pitch direction and the yaw direction while the maximum correction amount in the roll direction is secured will be described with reference to FIGS. 3A and 3B.

Figure 3A:
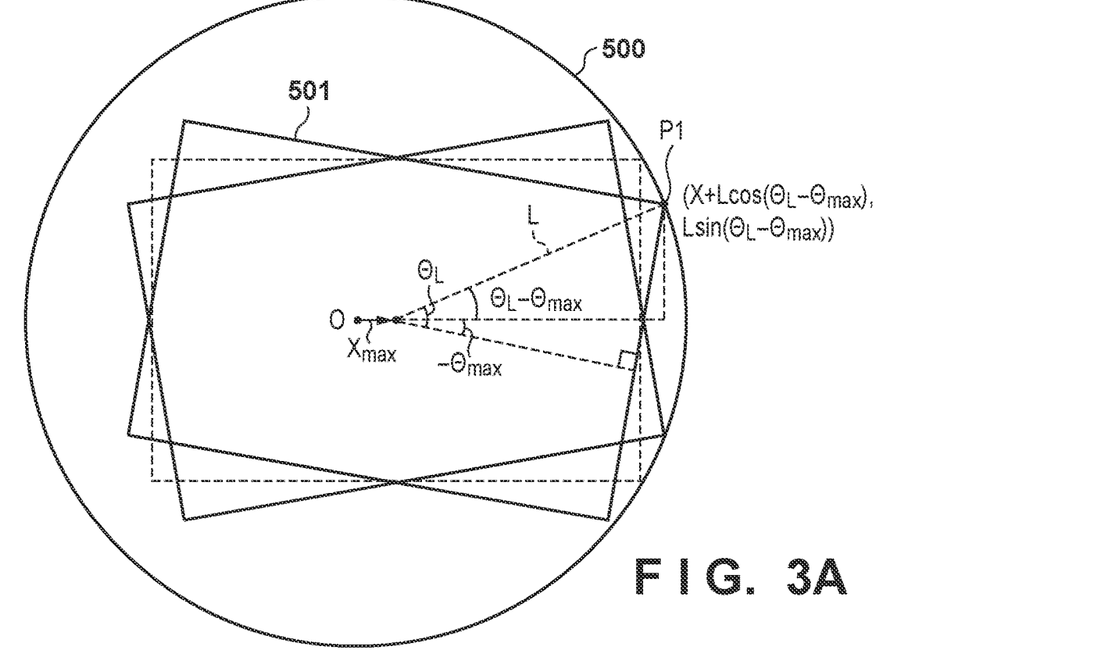
FIGS. 3A and 3B are views for explaining a correction range in a roll direction and correction ranges in a yaw direction and a pitch direction.

FIG. 3A illustrates a method for calculating the correction range in the yaw direction (rotation about the Y axis) with the correction range in the roll direction (rotation about the Z axis) being secured with respect to the image circle of the interchangeable lens 200 mounted on the camera body 100. The circle in FIG. 3A represents an image circle 500 of the interchangeable lens 200, and a rectangle partially inscribed inside the image circle 500 shows a light receiving region 501 of the image sensor 101.

It is assumed that the image sensor 101 is rotated counterclockwise by the angle $\Theta_{max}$ which is the maximum correction amount in the roll direction. With respect to the roll direction, counterclockwise rotation is defined as plus direction rotation, and clockwise rotation is defined as minus direction rotation. Further, let L be a half length of the diagonal line of the image sensor 101, and let $\Theta_L$ be the angle formed by the half of the diagonal line and a line parallel to the longer side of the rectangle at the center of gravity of the rectangle. At this time, a movement amount X in the yaw direction within a range in which the four corners of the light receiving region 501 do not exceed the image circle 500 is the maximum correction amount $X_{max}$ in the yaw direction.

When the image sensor 101 is moved in the plus direction, the coordinates of a point where a vertex P1 of the light receiving region 501 and the image circle 500 are in contact with each other are expressed as below, with the center O of the image circle 500 being (0, 0), $$(X_{max}+L\cos(\Theta_L-\Theta_{max}), L\sin(\Theta_L-\Theta_{max}))$$

If the radius of the image circle is R and the Pythagorean theorem is used, the following expression is obtained.

$$X_{max}=\sqrt{R^2-(L\sin(\Theta_L-\Theta_{max}))^2}-L\cos(\Theta_L-\Theta_{max}) \qquad (1)$$

Figure 3B:
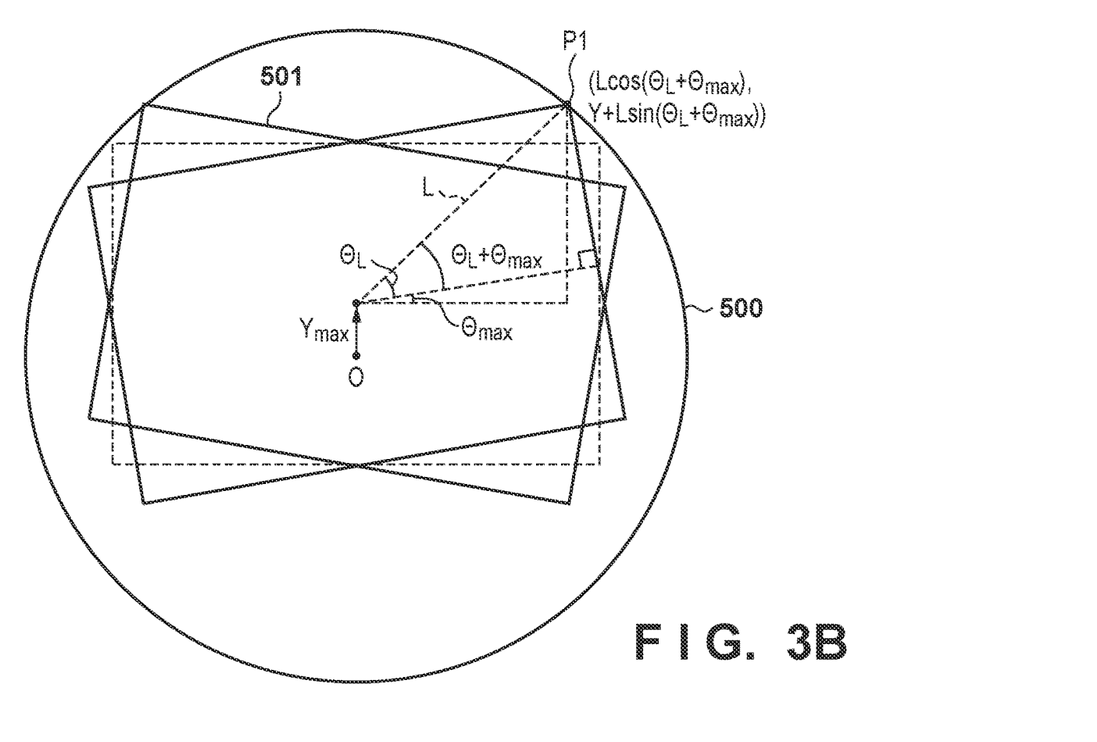

FIG. 3B is a diagram showing an image for explaining the calculation of the correction range in the pitch direction with respect to the image circle 500 of the interchangeable lens 200 mounted on the camera body 100, with the correction range in the roll direction being secured. Similar to FIG. 3A, a movement amount Y in the pitch direction within a range in which the four corners of the light receiving region 501 do not exceed the image circle 500 is the maximum correction amount $Y_{max}$ in the pitch direction.

When the image sensor 101 is moved in the plus direction, the coordinates of a point where the vertex P1 of the light receiving region 501 and the image circle 500 are in contact with each other are expressed as below, with the center O of the image circle 500 being (0, 0), $$(L\cos(\Theta_L+\Theta_{max}), Y_{max}+L\sin(\Theta_L+\Theta_{max}))$$

Here, using the radius R of the image circle and the Pythagorean theorem, the following expression is obtained.

$$Y_{max}=\sqrt{R^2-(L\cos(\Theta_L+\Theta_{max}))^2}-L\sin(\Theta_L+\Theta_{max}) \quad (2)$$

As described above, when the maximum correction amount $\pm\Theta_{max}$ is secured as the correction range in the roll direction, the correction range in the pitch direction is within the range shown by the maximum correction amount $\pm Y_{max}$, and the correction range in the yaw direction is within the range shown by the maximum correction amount $\pm X_{max}$ depending on the size of the image circle of the interchangeable lens 200 to be mounted.

When the correction range in the roll direction is secured in this way, the correction ranges in the yaw direction and the pitch direction are restricted. Therefore, by selecting in which direction the correction is to be performed, that is, by selecting which correction axis is used for correction, and by assigning the maximum correction amount suitable for the correction axis, it is possible to effectively utilize the range in which the image stabilization can be performed.

First Embodiment

Hereinafter, a first embodiment of the present invention will be described. In the first embodiment, in the image capturing system having the above configuration, correction axes to be used when image stabilization is performed by sensor image stabilization are set according to a shooting state. As described above, there are five types of correction axes for correcting shakes with respect to five axes, namely, angular shakes in the pitch direction and yaw direction, shift shakes in the up/down and right/left translational directions, and a roll shake in the rotational direction. Here, which of these correction axes is used is set.

Figure 4:
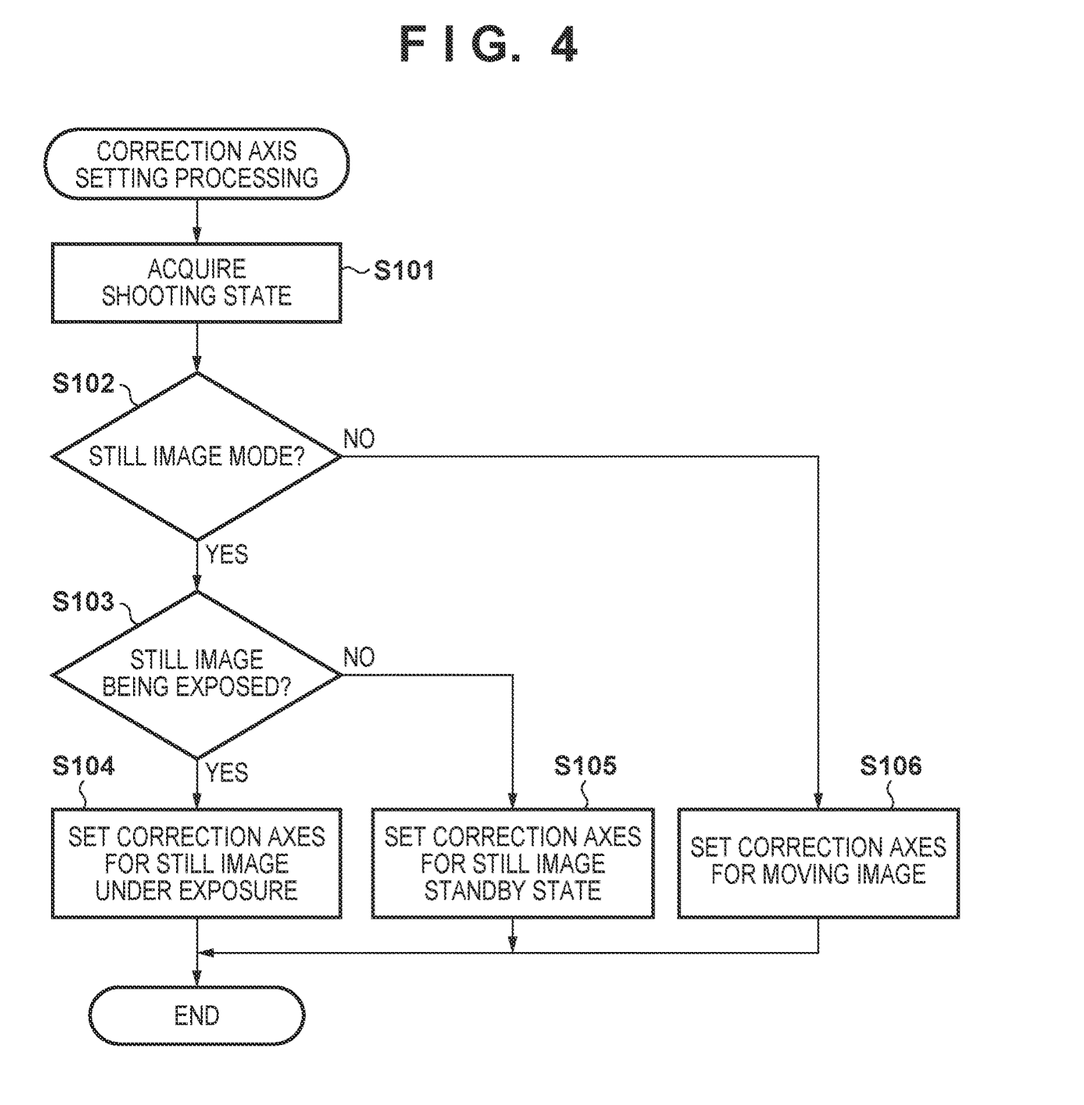
FIG. 4 is a flowchart showing correction axis setting processing depending on a shooting condition according to a first embodiment.

FIG. 4 is a flowchart showing a correction axis setting processing performed by the sensor image stabilization control unit 103 in a case where the image sensor 101 is driven to perform image stabilization control. The sensor image stabilization control unit 103 executes the processing shown in FIG. 4 in response to the image stabilization instruction from the camera microcomputer 102.

First, in step S101, the sensor image stabilization control unit 103 acquires a shooting state via the camera microcomputer 102.

Next, in step S102, the sensor image stabilization control unit 103 determines whether the shooting state acquired in step S101 indicates a still image mode. If the shooting state is the still image mode, the process proceeds to step S103, and if not the still image mode, the process proceeds to step S106.

In step S103, the sensor image stabilization control unit 103 determines whether the shooting state acquired in step S101 indicates that a still image is being exposed. If the still image is being exposed, the process proceeds to step S104, and if no still image is being exposed, the process proceeds to step S105.

In step S104, the sensor image stabilization control unit 103 sets the image stabilization control for still image under exposure. Specifically, the image stabilization control is set to be performed for all the correction axes.

On the other hand, in step S105, the sensor image stabilization control unit 103 determines that the shooting state indicates the still image mode but no still image is being exposed, namely, a standby state for a still image shooting, and sets the image stabilization control for still image standby state. Here, it is set so that the image stabilization control is not performed for any of the correction axes. This is to prepare for still image exposure by securing a correction amount during the still image exposure, thereby effectively utilizing the correctable range by the image stabilization driving unit 301.

In step S106, since it is determined that the shooting state does not indicate the still image mode, the sensor image stabilization control unit 103 determines that a moving image mode is set, and sets the image stabilization control for moving image. Specifically, the image stabilization control is set to be performed for all the correction axes.

Further, in the moving image mode, a larger correction amount may be assigned for the roll shake in the rotation direction, and smaller correction amounts may be assigned for the angular shakes and shift shakes. This is to effectively correct the roll shake that occurs when shooting a moving image especially while walking. Information from the camera shake detection unit 105 may be used to determine the shooting-while-walking state.

As described above, according to the first embodiment, the correction axes used in the image stabilization control are set according to the shooting state. During a still image standby state, the image stabilization control is not performed in all directions so as to prepare for still image exposure, while the image stabilization control is performed in all directions during still image exposure or in the moving image mode. Further, by allocating a large correction amount in the roll direction in the moving image mode, it is possible to effectively correct the roll shake that occurs during shooting a moving image especially while walking.

It should be noted that, in the above-mentioned example, it is described that all the correction axes are set in steps S104 and S106 and none of the correction axes is set in step S105, but the present invention is not limited to this. For example, image stabilization control may be performed on some of the correction axes in the still image standby state. Further, different correction axes may be set for the still image under exposure and for the moving image mode.

Second Embodiment

Next, a second embodiment of the present invention will be described. In the second embodiment, correction axes used in image stabilization control by the image stabilization driving unit 301 are set according to the mounted interchangeable lens in addition to the shooting state.

Figure 5:
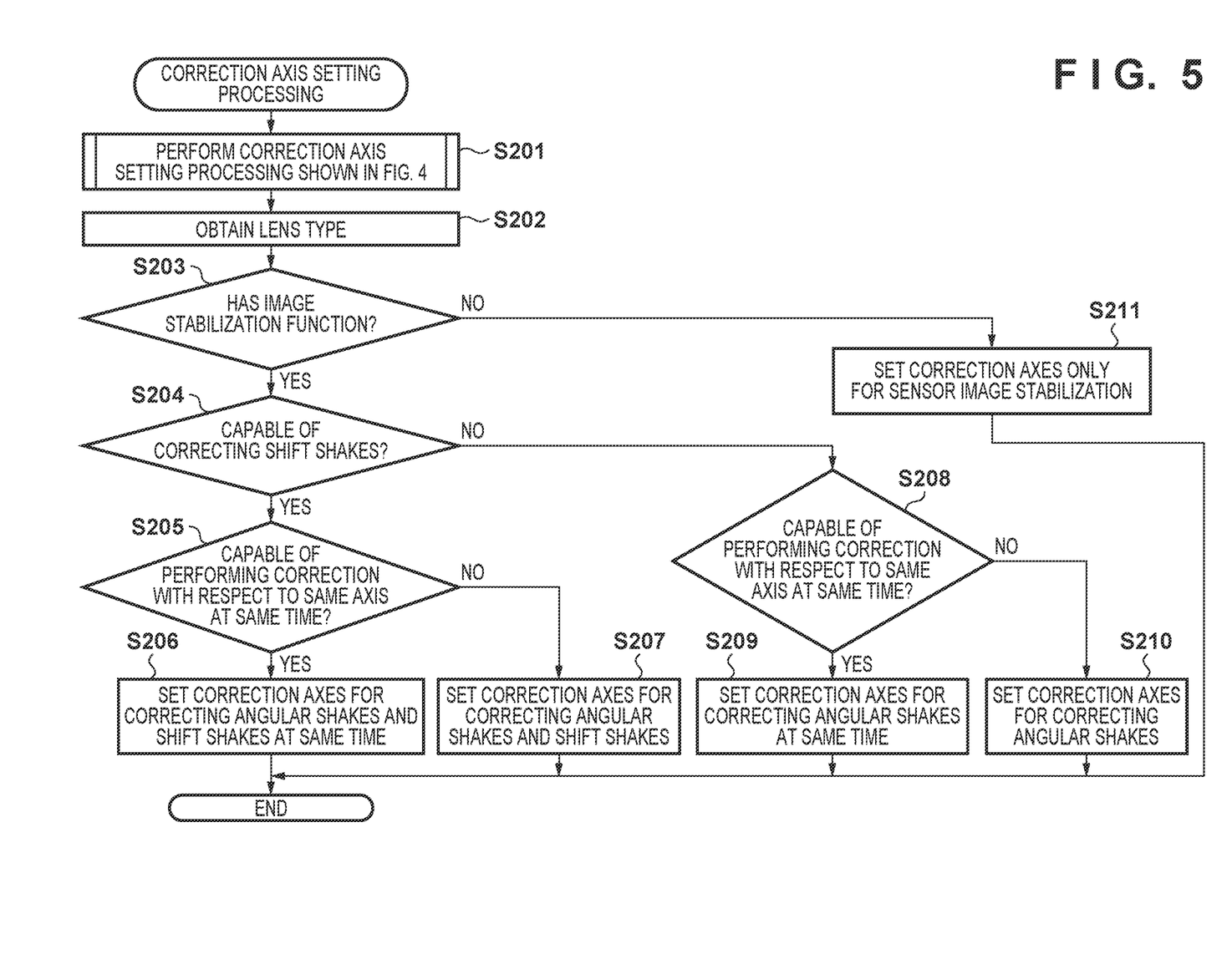
FIG. 5 is a flowchart showing correction axis setting processing depending on a shooting condition and the type of an attached interchangeable lens according to a second embodiment.

FIG. 5 is a flowchart showing correction axis setting processing performed by the sensor image stabilization control unit 103 when the image sensor 101 is driven to perform image stabilization control. The sensor image stabilization control unit 103 executes the processing shown in FIG. 5 in response to the image stabilization instruction from the camera microcomputer 102.

First, in step S201, the sensor image stabilization control unit 103 sets the correction axes according to the shooting state as described in the flowchart of FIG. 4 in the first embodiment.

Next, in step S202, the sensor image stabilization control unit 103 acquires lens type information of the interchangeable lens attached to the camera body 100 via the camera microcomputer 102.

In step S203, the sensor image stabilization control unit 103 determines whether or not the interchangeable lens has an image stabilization function, based on the lens type information acquired in step S202. If the lens has the image stabilization function, the process proceeds to step S204, and if the lens does not have the image stabilization function (non-image stabilization lens), the process proceeds to step S211. In step S211, as the attached interchangeable lens does not have the image stabilization function, the correction axes are set accordingly.

On the other hand, in step S204, the sensor image stabilization control unit 103 determines whether the shift shakes can be corrected in addition to the angular shakes based on the lens type information acquired in step S202. If the interchangeable lens has a function to correct the shift shakes (angular-and-shift-shake-correctable lens), process proceeds to step S205, and if the interchangeable lens does not have a function to correct the shift shakes (angular-shake-correctable lens), process proceeds to step S208.

In step S205, the sensor image stabilization control unit 103 determines from the lens type information acquired in step S202 whether or not lens image stabilization and sensor image stabilization can be performed simultaneously with respect to the same correction axes. If the interchangeable lens can perform the lens image stabilization during the sensor image stabilization is performed with respect to the same correction axes, the process proceeds to step S206, and if not, the process proceeds to step S207.

In step S206, as the attached interchangeable lens is an angular-and-shift-shake-correctable lens and is capable of performing the lens image stabilization during the sensor image stabilization is performed with respect to the same correction axes, the correction axes are set accordingly.

On the other hand, in step S207, as the attached interchangeable lens is an angular-and-shift shake-correctable lens but is not capable of performing the lens image stabilization during the sensor image stabilization is performed with respect to the same correction axes, the correction axes are set accordingly.

In step S208, the sensor image stabilization control unit 103 determines whether or not the attached angular-shake-correctable lens is capable of performing the lens image stabilization during the sensor image stabilization is performed with respect to the same correction axes based on the lens type information acquired in step S202. If the interchangeable lens is capable of performing the lens image stabilization during the sensor image stabilization is performed with respect to the same correction axis, the process proceeds to step S209, and if not, the process proceeds to step S210.

In step S209, as the attached interchangeable lens is an angular-shake-correctable lens and is capable of performing the lens image stabilization during the sensor image stabilization is performed with respect to the same correction axes, the correction axes are set accordingly.

On the other hand, in step S210, as the attached interchangeable lens is an angular-shake-correctable lens but is not capable of performing the lens image stabilization during the sensor image stabilization is performed with respect to the same correction axes, the correction axes are set accordingly.

When the setting is completed in any of steps S206, 207, and S209 to S211, the processing ends.

Figure 6A:
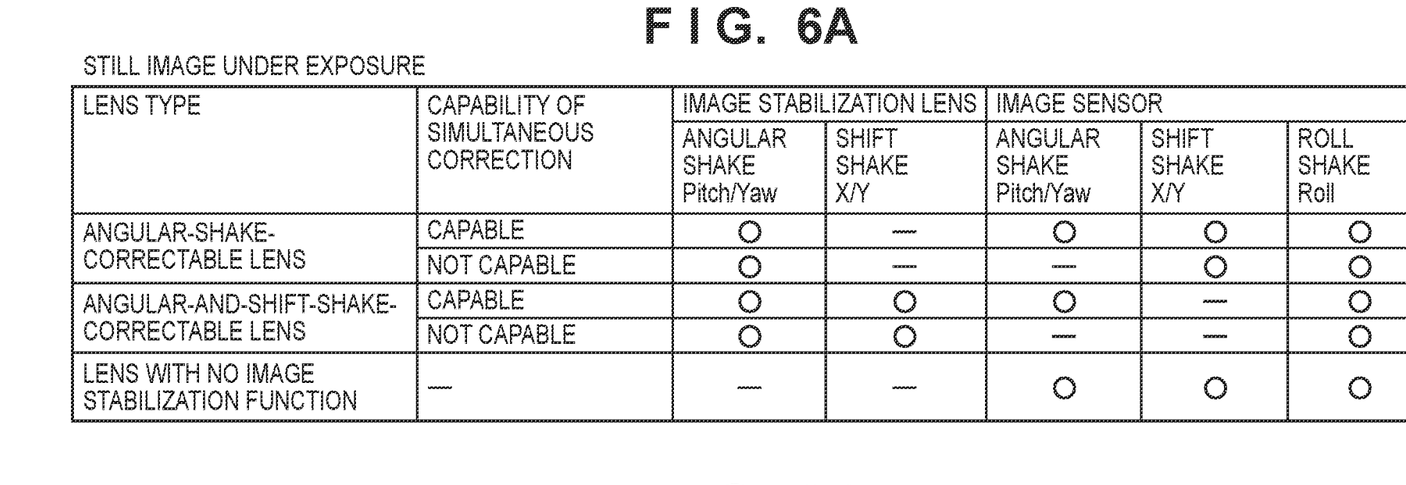
FIGS. 6A to 6C are examples of correction axes to be set in accordance with a shooting condition and the type of an attached interchangeable lens according to the second embodiment.
Figure 6B:
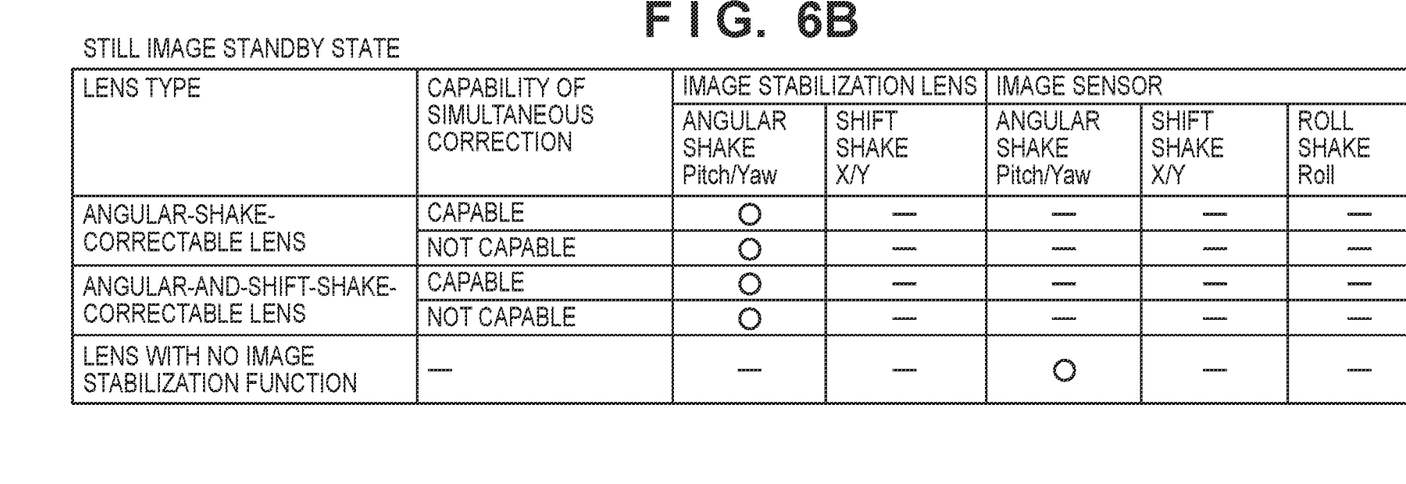
Figure 6C:
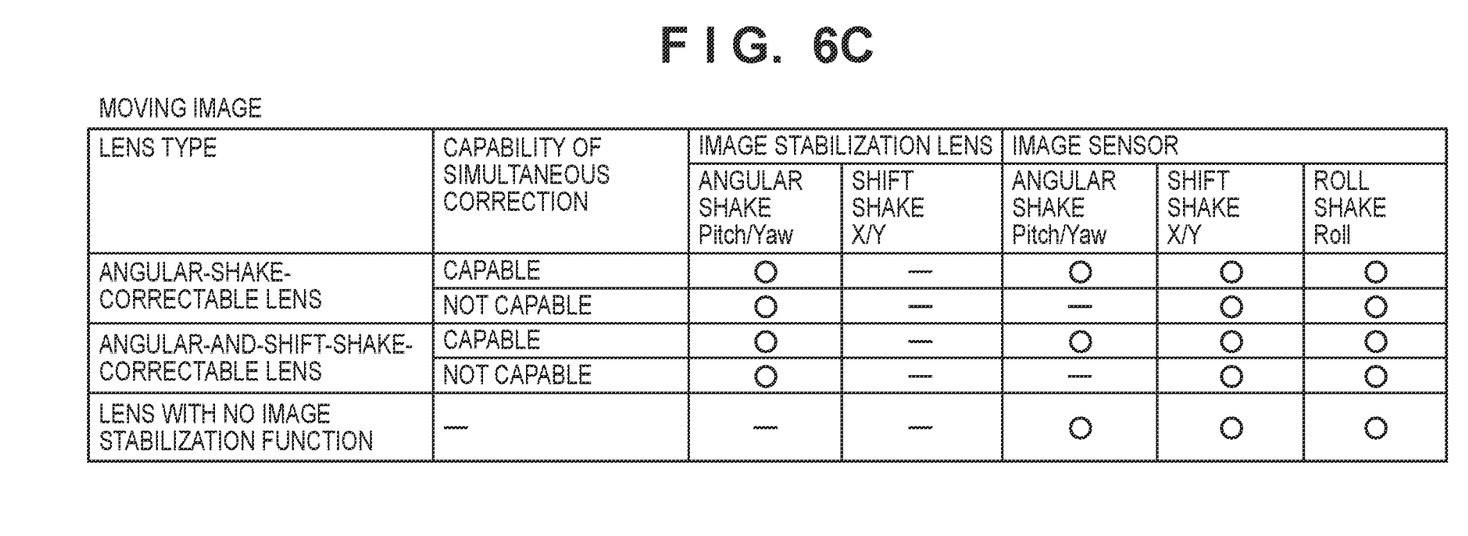

Next, FIGS. 6A to 6C show examples of correction axes used for image stabilization control, which will be set in steps S206 to S207 and S209 to S211 according to the type of the attached lens. A part of the setting of the correction axes performed in S201 according to the shooting state are changed according to the lens type.

For example, as shown in FIG. 6A, in a case where an angular-shake-correctable lens or an angular-and-shift-shake-correctable lens is attached at the time of still image exposure, if the lens cannot cooperate with the sensor image stabilization, the lens performs image stabilization for the axes for which the lens can correct, and the image stabilization for the rest of the axes is performed by the camera body 100. On the other hand, if the lens can cooperate with the sensor image stabilization with respect to the same correction axes, the angular shake is corrected simultaneously in the lens and the camera body 100, and the shift shake is corrected in the lens or the camera body 100.

This is because, if the lens cannot cooperate with the sensor image stabilization, the camera body 100 has to correct shakes only for the remaining correction axes, which can increase the maximum correction amount allocated to each correction axis and effectively utilize the sensor image stabilization. On the other hand, if the lens can cooperate with the sensor image stabilization, the correction amount allocated to each correction axis is small because the shakes are corrected with respect to many correction axes, but the total correction amount increases and the effect of image stabilization also increases since the lens image stabilization and the sensor image stabilization can be performed with respect to the same axes at the same time. Further, by correcting the shift shakes in the lens or the camera body 100, it is possible to reduce the shake correction error. This is because if each of the lens and the camera body 100 obtains the radius of gyration when acquiring the correction amount of the shift shakes, error may be added on the radius of gyration acquired by the lens and on the radius of gyration acquired by the camera body 100. It should be noted that the method of acquiring the radius of gyration and the method of acquiring the amount of the shift shakes using the radius of gyration are known techniques, and are described in, for example, Japanese Patent Laid-Open Nos. 2010-054986 and 2017-126040. Therefore, detailed description of these methods is omitted here.

Further, when performing moving image shooting, as shown in FIG. 6C, correction of the shift shakes is performed only in the camera body 100 even if an angular-shift-shake-correctable lens is attached. That is, in a case where an angular-shift-shake-correctable lens is mounted, correction of the shift shake is performed only on the lens side during still image exposure, and correction of the shift shake is performed only on the camera body 100 side during moving image shooting. The method of setting the other correction axes is the same as that for the still image exposure.

On the other hand, as shown in FIG. 6B, in the still image standby state, correction is not performed for all axes depending on the shooting state, but in a case where a lens which does not have the image stabilization function is attached, correction of angular shifts may be performed to suppress image blur even during the still image standby state.

As described above, according to the second embodiment, correction axes to be used in the lens image stabilization and correction axes to be used in the sensor image stabilization are set depending on the correction axes for shakes that can be corrected by the interchangeable lens attached to the camera body and capability of the interchangeable lens to perform the lens image stabilization in cooperation with the sensor image stabilization at the same time, in addition to the shooting state. In this manner, it is possible to effectively utilize the lens image stabilization and the sensor image stabilization.

Third Embodiment

Next, a third embodiment of the present invention will be described. In the third embodiment, the correction axes used in the image stabilization by the image stabilization driving unit 301 are set according to the attached interchangeable lens, in addition to the shooting state, and the allocation of the correction amount is changed according to the shooting condition.

In general, the effect of the shift shakes becomes significant in macro photography when the shooting magnification is large. Therefore, in a case where an angular-shake-correctable lens or a lens which does not have the image stabilization function is attached and the shift shakes are corrected by the sensor image stabilization when a still image exposure is performed, large correction amounts for the shift shakes is set and small correction amounts for the angular shakes and the roll shake are correspondingly set in macro photography. In this way, it is possible to suppress the effect of the shift shakes.

Further, the allocation of the correction amount may be changed according to the holding state of the camera. For example, in the case of fixed-point shooting with a firm posture, the influence of the angular shakes is significant, and therefore the correction amounts are preferentially assigned to the angular shakes. Further, as described in the first embodiment, since the influence of the roll shake increases in the moving image shooting while walking, the correction amount is preferentially assigned to the roll shake.

Also, if electronic image stabilization that corrects shakes by shifting a range to be read from the image sensor 101 is effective, the correction of the roll shake may be performed only by the electronic image stabilization, the correction with respect to other correction axes may be performed with optical image stabilization in which the image sensor 101 is driven. On the contrary, it is also possible to perform correction with respect to the correction axes except for the correction axis for the roll shake by the electronic image stabilization, and only the roll shake is corrected in the optical image stabilization in which the image sensor 101 is driven. In general, since an image stabilization lens cannot correct the roll shake, by correcting the roll shake by moving the image sensor 101 or by using the electronic image stabilization, it is possible to enhance the total image stabilization effect.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-197651, filed on Oct. 30, 2019 which is hereby incorporated by reference herein in its entirety.

What is claimed is:

1. An image stabilization apparatus comprising:
   a setting unit that sets a correction axis to be used in image stabilization among correction axes of a first image stabilization unit being provided in an image capturing apparatus based on a type of a lens unit attached to the image capturing apparatus; and
   a calculation unit that obtains a driving amount of the first image stabilization unit for correcting a shake with respect to the set correction axis based on an amount of shake of the image capturing apparatus,
   wherein the setting unit sets the correction axis so that a different correction axis is set in a case where the image capturing apparatus is in a moving image shooting state and in a case where the image capturing apparatus is in a still image shooting state,
   wherein, in a case where the lens unit has a second image stabilization unit, the setting unit sets the correction axis so that a different correction axis is set in a case where the second image stabilization unit is capable of performing image stabilization in cooperation with the first image stabilization unit with respect to the same correction axis at the same time and in a case where the second image stabilization unit is not capable of performing image stabilization in cooperation with the first image stabilization unit with respect to the same correction axis at the same time, and
   wherein each unit is implemented by one or more processors, circuitry or a combination thereof.

2. The image stabilization apparatus according to claim 1, wherein the setting unit sets the correction axis based on a shooting state of an image capturing apparatus so that a different correction axis is set in a case where the image capturing apparatus is in a moving image shooting state and in a case where the image capturing apparatus is in a still image shooting state.

3. The image stabilization apparatus according to claim 2, wherein the shooting state is one of states including a state during still image exposure, a state during a standby period of still image shooting, and a state during moving image shooting.

4. The image stabilization apparatus according to claim 3, wherein all the correction axes of the first image stabilization unit are set to be used in the image stabilization in a case where the shooting state is the state during still image exposure.

5. The image stabilization apparatus according to claim 3, wherein at least part of the correction axes of the first image stabilization unit is set so as not to be used in the image stabilization in a case where the shooting state is the state during a standby period of still image shooting.

6. The image stabilization apparatus according to claim 3, wherein all the correction axes of the first image stabilization unit are set to be used in the image stabilization in a case where the shooting state is the state during moving image shooting.

7. The image stabilization apparatus according to claim 1, wherein
the setting unit sets the correction axis to be used in the image stabilization out of the correction axes of the first image stabilization unit and correction axes of a second image stabilization unit in a case where the lens unit has the second image stabilization unit.

8. The image stabilization apparatus according to claim 1, wherein the type of the lens unit includes information on the correction axes of the second image stabilization unit and information on capability of performing image stabilization in cooperation with the first image stabilization unit with respect to the same correction axis at the same time.

9. The image stabilization apparatus according to claim 1, wherein, in a case where the second image stabilization unit is not capable of performing image stabilization in cooperation with the first image stabilization unit with respect to the same correction axis at the same time, the setting unit preferentially sets a correction axis of the second image stabilization unit as the correction axis to be used in the image stabilization.

10. The image stabilization apparatus according to claim 1, wherein the correction axes of the second image stabilization unit include correction axes for angular shakes and correction axes for shift shakes.

11. The image stabilization apparatus according to claim 1, wherein the correction axes of the first image stabilization unit includes a correction axis for a shake with an optical axis being a center of rotation, correction axes for angular shakes and correction axes for shift shakes.

12. The image stabilization apparatus according to claim 1, wherein the setting unit further changes allocation of correction amounts for the correction axes to be used in the image stabilization in accordance with shooting conditions.

13. The image stabilization apparatus according to claim 2, wherein the shooting conditions include magnification, a holding state of the image capturing apparatus, a setting of whether or not to perform electronic image stabilization.

14. An image capturing apparatus comprising:
an image sensor that performs photoelectric conversion on a subject image; and
an image stabilization apparatus which comprises:
a setting unit that sets a correction axis to be used in image stabilization among correction axes of a first image stabilization unit being provided in an image capturing apparatus based on a type of a lens unit attached to the image capturing apparatus; and
a calculation unit that obtains a driving amount of the first image stabilization unit for correcting a shake with respect to the set correction axis based on an amount of shake of the image capturing apparatus,
wherein, in a case where the lens unit has a second image stabilization unit, the setting unit sets the correction axis so that a different correction axis is set in a case where the second image stabilization unit is capable of performing image stabilization in cooperation with the first image stabilization unit with respect to the same correction axis at the same time and in a case where the second image stabilization unit is not capable of performing image stabilization in cooperation with the first image stabilization unit with respect to the same correction axis at the same time,
wherein the first image stabilization unit is comprised of the image sensor and a driving unit that drives the image sensor with respect to the correction axes, and
wherein each unit is implemented by one or more processors, circuitry or a combination thereof.

15. An image stabilization method comprising:
setting a correction axis to be used in image stabilization among correction axes of a first image stabilization unit being provided in an image capturing apparatus based on a type of a lens unit attached to the image capturing apparatus; and
obtaining a driving amount of the first image stabilization unit for correcting a shake with respect to the set correction axis based on an amount of shake of the image capturing apparatus,
wherein, in a case where the lens unit has a second image stabilization unit, a different correction axis is set in a case where the second image stabilization unit is capable of performing image stabilization in cooperation with the first image stabilization unit with respect to the same correction axis at the same time and in a case where the second image stabilization unit is not capable of performing image stabilization in cooperation with the first image stabilization unit with respect to the same correction axis at the same time.

16. A non-transitory computer-readable storage medium, the storage medium storing a program that is executable by the computer, wherein the program includes program code for causing the computer to function as an image stabilization apparatus comprising:
a setting unit that sets a correction axis to be used in image stabilization among correction axes of a first image stabilization unit being provided in an image capturing apparatus based on a type of a lens unit attached to the image capturing apparatus; and
a calculation unit that obtains a driving amount of the first image stabilization unit for correcting a shake with respect to the set correction axis based on an amount of shake of the image capturing apparatus,
wherein, in a case where the lens unit has a second image stabilization unit, the setting unit sets the correction axis so that a different correction axis is set in a case where the second image stabilization unit is capable of performing image stabilization in cooperation with the first image stabilization unit with respect to the same correction axis at the same time and in a case where the second image stabilization unit is not capable of performing image stabilization in cooperation with the first image stabilization unit with respect to the same correction axis at the same time.

17. The image stabilization apparatus according to claim 1, wherein, in a case where the lens unit is capable of performing image stabilization in cooperation with the first image stabilization unit with respect to the same correction axis at the same time and is capable of performing shift shake correction, the setting unit sets the correction axis to be used in the image stabilization among the correction axes of the first image stabilization unit and correction axes of the second image stabilization unit such that an angular shake is corrected by the first image stabilization unit and the second image stabilization unit, and shift shakes are corrected one of the first image stabilization unit and the second image stabilization unit.

18. The image stabilization apparatus according to claim 1, wherein, in a case wherein the lens unit has the second image stabilization unit that is capable of correcting shift shakes, the setting unit sets the correction axis to be used in the image stabilization among the correction axes of the first image stabilization unit and correction axes of the second image stabilization unit such that shift shakes are corrected by one of the first image stabilization unit and the second image stabilization unit in the moving image shooting state, and shift shakes are corrected by the other of the first image stabilization unit and the second image stabilization unit in the still image shooting state.

19. The image stabilization apparatus according to claim 1, wherein, in a case wherein the lens unit has the second image stabilization unit that is capable of correcting shift shakes, the setting unit sets the correction axis to be used in the image stabilization among correction axes of the second image stabilization unit such that the second image stabilization unit does not correct the shift shakes during a standby period of still image shooting.

* * * * *

UNITED STATES PATENT AND TRADEMARK OFFICE
CERTIFICATE OF CORRECTION

PATENT NO. : 11,381,746 B2
APPLICATION NO. : 17/083019
DATED : July 5, 2022
INVENTOR(S) : Shunichiro Ikeda It is certified that error appears in the above-identified patent and that said Letters Patent is hereby corrected as shown below:

In the Claims

Column 14, Lines 18-45, delete:
"1. An image stabilization apparatus comprising:
    a setting unit that sets a correction axis to be used in image stabilization among correction axes of a first image stabilization unit being provided in an image capturing apparatus based on a type of a lens unit attached to the image capturing apparatus; and
    a calculation unit that obtains a driving amount of the first image stabilization unit for correcting a shake with respect to the set correction axis based on an amount of shake of the image capturing apparatus,
    wherein the setting unit sets the correction axis so that a different correction axis is set in a case where the image capturing apparatus is in a moving image shooting state and in a case where the image capturing apparatus is in a still image shooting state,
    wherein, in a case where the lens unit has a second image stabilization unit, the setting unit sets the correction axis so that a different correction axis is set in a case where the second image stabilization unit is capable of performing image stabilization in cooperation with the first image stabilization unit with respect to the same correction axis at the same time and in a case where the second image stabilization unit is not capable of performing image stabilization in cooperation with the first image stabilization unit with respect to the same correction axis at the same time, and
    wherein each unit is implemented by one or more processors, circuitry or a combination thereof."

And insert:
--1. An image stabilization apparatus comprising:
    a setting unit that sets a correction axis to be used in image stabilization among correction axes of a first image stabilization unit being provided in an image capturing apparatus based on a type of a lens unit attached to the image capturing apparatus; and
    a calculation unit that obtains a driving amount of the first image stabilization unit for correcting a shake with respect to the set correction axis based on an amount of shake of the image capturing apparatus, Signed and Sealed this
Thirteenth Day of December, 2022

*Katherine Kelly Vidal*

Katherine Kelly Vidal
*Director of the United States Patent and Trademark Office* wherein, in a case where the lens unit has a second image stabilization unit, the setting unit sets the correction axis so that a different correction axis is set in a case where the second image stabilization unit is capable of performing image stabilization in cooperation with the first image stabilization unit with respect to the same correction axis at the same time and in a case where the second image stabilization unit is not capable of performing image stabilization in cooperation with the first image stabilization unit with respect to the same correction axis at the same time, and wherein each unit is implemented by one or more processors, circuitry or a combination thereof.--